United States Patent [19]

Hartman

[11] Patent Number: 5,557,284
[45] Date of Patent: Sep. 17, 1996

[54] SPOOFING DETECTION SYSTEM FOR A SATELLITE POSITIONING SYSTEM

[75] Inventor: Randolph G. Hartman, Plymouth, Minn.

[73] Assignee: Honeywell Inc., Minneapolis, Minn.

[21] Appl. No.: 383,158

[22] Filed: Feb. 3, 1995

[51] Int. Cl.⁶ ........................................ G01S 5/02
[52] U.S. Cl. ................................. 342/357; 342/352
[58] Field of Search .................... 342/357, 352; 455/12.1

[56] References Cited

U.S. PATENT DOCUMENTS

| | | | |
|---|---|---|---|
| 4,754,283 | 6/1988 | Fowler | 342/461 |
| 4,894,655 | 1/1990 | Joquet et al. | 340/988 |
| 5,119,102 | 6/1992 | Barnard | 342/357 |
| 5,311,194 | 5/1994 | Brown | 342/357 |
| 5,311,197 | 5/1994 | Sorden et al. | 342/457 |
| 5,379,045 | 1/1995 | Gilbert et al. | 342/357 |

Primary Examiner—Thomas H. Tarcza
Assistant Examiner—Dao L. Phan
Attorney, Agent, or Firm—Charles J. Ungemach

[57] ABSTRACT

A pair of antennae in combination with a GPS signal receiver system is employed for detecting the reception of satellite information signals from a spoofing signal transmitter as opposed to those satellite information signals transmitted aboard each of the satellite vehicles which form a satellite positioning system. As described herein, an indication of the pointing angle between the antennae and the actual transmitter transmitting the satellite information signals is detected. The pointing angle and/or alternatively the range difference may be observed by monitoring the behavior of the pseudo random code associated with the carrier of the satellite information signal, or the carrier itself. In turn, pseudo range measurements, pseudo range rate measurements, carrier phase measurements, and or Doppler count measurement associated with the two antennae may be use to obtain the desired discriminant.

10 Claims, 4 Drawing Sheets

SPOOFING DETECTION SYSTEM FOR A SATELLITE POSITIONING SYSTEM

BACKGROUND OF THE INVENTION

1. Field of the Invention

The present invention pertains to satellite positioning systems, and more specifically to a spoofing detection system for a satellite positioning system.

2. Description of the Related Art

Satellite positioning systems, sometimes referred to as global positioning systems or GPS, are now well-known in the art. Such systems, for example, NAVSTAR-GPS are rapidly being used for determination of the geocentric position of mobile units, such as water and land vehicles, aircraft and survey equipment to name a few. Herein, such satellite positioning systems are referred to as simply GPS systems, and include among others, the aforesaid NAVSTAR and GLONASS GPS systems.

In aircraft, GPS systems are being utilized for navigation, flight control, and air space control. These GPS systems may operate independently or in combination with inertial reference systems or attitude heading reference systems in order to provide information during an aircraft flight mission.

Global positioning systems similar to NAVSTAR commonly use a satellite information signal receiver system herein referred to generally as a GPS signal receiver system. The GPS signal receiver system is commonly located on a mobile unit for receiving satellite information signals transmitted from a plurality of satellites. Each GPS satellite transmits an information signal containing data that allows a user to determine the range or distance between selected GPS satellites and the antenna associated with the mobile unit's GPS signal receiver system. These distances are then used to compute the position of the GPS signal receiver system, particularly the associated antenna, using known triangulation techniques. For example, in the NAVSTAR-GPS system, a mobile unit, such as an aircraft, with a GPS signal receiver system detects a pseudo random code contained in a given GPS satellite information signal carrier and derives therefrom the "elapsed time" or time delay between the transmission of the signal and its reception at the antenna by the GPS signal receiver system. From this time delay, the GPS signal receiver system can derive the range between the GPS signal receiver system antenna and the satellite, sometimes referred to as the pseudo-range or pseudo-range measurement. Herein, the GPS signal receiver system's position, or the mobile unit's position, generally refers to the corresponding antenna position.

The GPS signal receiver systems known in the art may also determine range by analysis of the satellite information carrier signal. This, of course, is done after the pseudo random code has been captured for subsequent satellite vehicle identification as well as capturing the ephemeris data and/or almanac data from which satellite vehicle position may be determined at selected receiver measurement times. The satellite information signal characteristics, namely phase and frequency, may separately be used for determining range between a specific satellite vehicle and an individual antenna. For example pseudo range rate may be derived from the frequency characteristics and be used to obtain what is referred to as carrier smoothed pseudo range values. Another frequency characteristic is Doppler shift and may be measured by the use of integrated Doppler counts over a fixed time interval as well understood and commonly employed in GPS signal receiver systems known in the art. Lastly carrier phase may be signal process for subsequent determination of antenna position as is also well understood in the art.

As part of the NAVSTAR-GPS system, each satellite information signal also contains precise ephemeris and coarse almanac data which both describe the corresponding satellite's orbital trajectory in earth centered space as is well known in the art. The GPS signal receiver system incorporates signal processing for deriving the either ephemeris data or coarse almanac data from the satellite information signals. In turn, the GPS signal receiver system may derive the geocentric position of the satellite at selected moments of time, generally related to the GPS signal receiver system pseudo range measurement time.

Because of the advancements of GPS technology, the U.S. Federal Aviation Administration is moving toward greater reliance upon satellite positioning systems, and in particular employment of GPS based landing systems, including "differential GPS", thereby eliminating the need for either ILS or MLS landing systems. Accordingly there is a need for enhancing the success of a flight mission intending to rely upon a GPS based landing system.

In particular, users of GPS like systems are particularly concerned about the potential of spoofing. Spoofing is intentionally creating erroneous GPS-like information signals having carrier characteristics being the same as the usual GPS satellite information signals. These spoofing signals may cause the user of such spoofer generated erroneous GPS information signals to be driven off track, particularly during the approach and landing phases of a flight mission.

One method for protecting against GPS signal spoofing is to encrypt the signal transmitted from the satellite vehicles such that no spoofer could emulate a false signal which could spoof a tracked signal. However such a system would be difficult to employ without adding significant costs to the GPS signal receiver system.

SUMMARY OF THE INVENTION

The present invention provides a method and apparatus for detecting a GPS spoofing environment.

In the present invention, a GPS spoofing detection apparatus includes at a satellite positioning signal receiver system for tracking satellite vehicles transmitting a selected RF carrier signal. The satellite positioning signal receiver system includes at least first and second antennae rigidly fixed to a platform, separated by a known separation distance, and provide first and second electrical signals, respectively, in response to received RF carrier signals including satellite information signals transmitted from selected satellites, which form, in part, a satellite based global positioning system, and those RF signals transmitted from a spoofing signal generator. A satellite positioning signal receiver system is coupled to the antennae, and configured to separately process the first and second electrical signals for providing satellite-antenna specific relative range values. In turn a relative range difference processor derives, from the first and second satellite-antenna specific relative range values, information representative of satellite-specific relative range difference values, each related to a satellite-specific pointing angle between a vector between the first and second antennae and a vector between the first antennae and one of the tracked satellites. In turn, an analyzing processor is provided for analyzing and/or comparing, the satellite-specific relative range difference values, or alternatively, "rate of change" measurements of the satellite-specific relative range difference values, associated with one or more satellites with a spoofing detection threshold whereby an indication is provided as to whether or not a the GPS signal receiver system is operating on erroneous signals generated by a spoofing signal generator.

DESCRIPTION OF THE PREFERRED EMBODIMENT

In the following description, it should be recognized that a mobile unit's three-dimensional geocentric position in World Geodetic System Coordinates may be determined by deriving pseudo range information from the satellite information signals from four or more satellites and the knowledge of the position of the satellites derived preferably from the ephemeris data from the individual satellites or alternatively the almanac data. This position information is also provided by GPS signal receiver systems known in the art. Herein, it should be understood that the World Geodetic System is an earth-centered, earth-fixed geocentric coordinate system, which may be converted to any other coordinate system as required by the user, for example latitude, longitude, and altitude. Sometimes the aforementioned coordinate system is referred to as the WGS84 earth-centered, earth-fixed, rectangular coordinate frame. Herein, the World Geodetic System Coordinates should be presumed, and position refers to the "x,y,z" three dimensional WGS84 coordinate system, unless otherwise indicated.

In order to determine the position of a GPS signal receiver system unit, a minimum of four satellite information signals, rather than the expected three, are required to be tracked by the GPS signal receiver system. This is so, since the GPS signal receiver system includes a receiver clock which is not as accurate as the atomic clock of the satellites. Therefore, receiving satellite information signals from four different satellites provides a complete solution which permits the correction of any receiver clock error as is well understood in the art. Herein, the corrected receiver clock time is referred to as the receiver time. Thus, if signals from four or more satellites are available to the GPS signal receiver system unit, the geocentric position of the signal receiver system may be determined within approximately one-hundred meters of its "true" geocentric position.

Herein, the GPS signal receiver system position derived by the triangulation technique using data from multiple satellites is referred to as the "estimated position". The accuracy of the estimated position of the GPS signal receiver system unit is dependent upon many factors including, among others, atmospheric conditions, selective availability, and the relative position of the satellites with respect to the line-of-sight view of the satellites.

Figure 1:
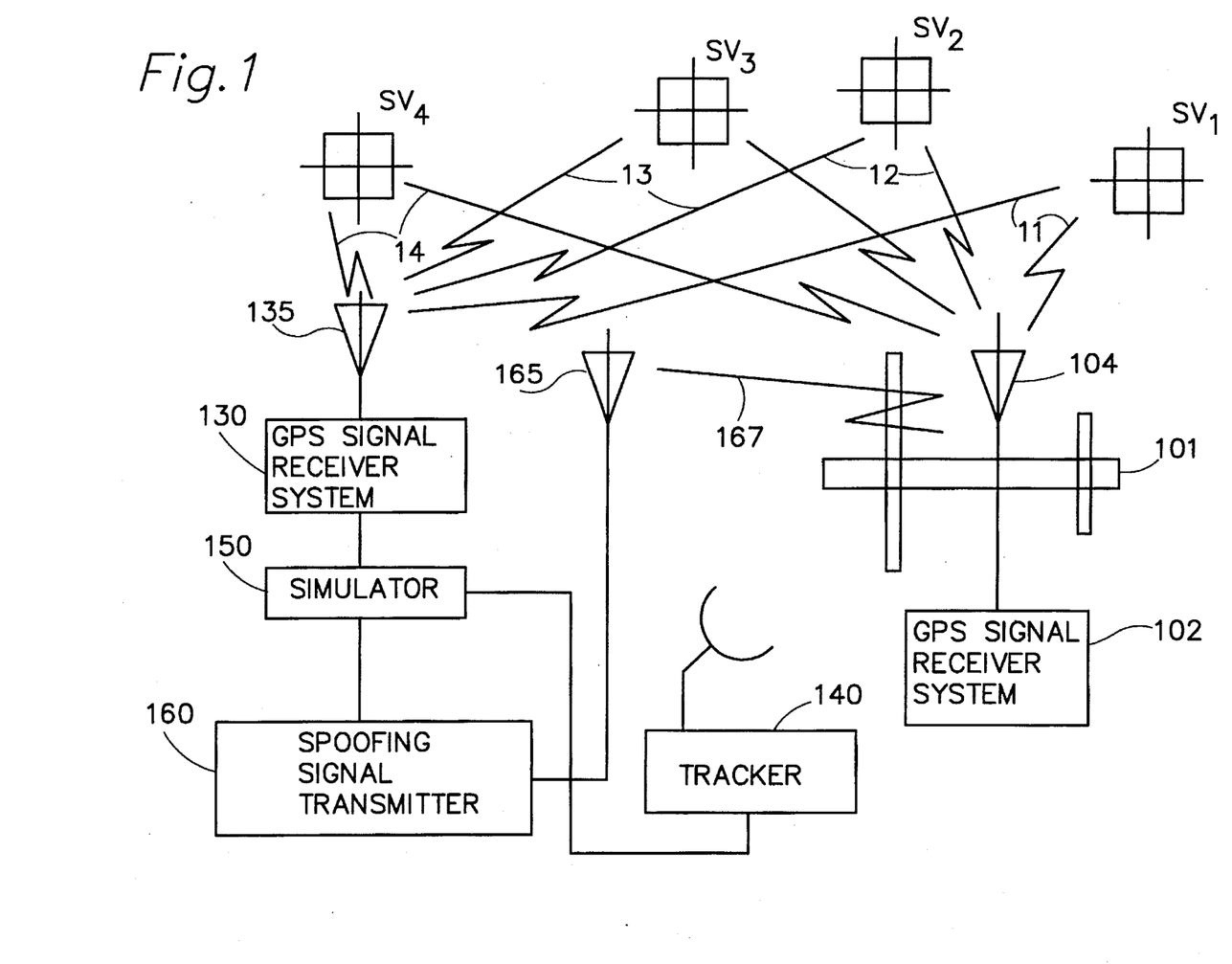
FIG. 1 is a diagram illustrating a satellite positioning system spoofing scenario.

Shown in FIG. 1 is a diagram illustrating a satellite positioning system spoofing scenario. A mobile unit such as an aircraft 101 includes GPS signal receiver system 102 coupled to a GPS antenna 104 for receiving GPS satellite information signals from satellite vehicles $SV_1$, $SV_2$, $SV_3$ and $SV_4$, and perhaps others (not shown).

As is well understood in the art, GPS signal receiver system 102 derives the pseudo ranges between antenna 104 and each of the satellites from the corresponding satellite information signals 11, 12, 13 and 14 for determining pseudo range values $P_1$, $P_2$, $P_3$ and $P_4$, respectively, and satellite trajectory information in a well known manner. In turn, GPS signal receiver system 102 employs signal processing schemes for deriving the estimated aircraft position and generally provides signal lines containing the aforesaid information for subsequent signal processing.

The spoofing scenario includes a GPS signal receiver system 130, similar to GPS signal receiver system 102, coupled to antenna 135 for receiving the same satellite information signals 11, 12, 13 and 14 (and perhaps others not shown) as those received by GPS signal receiver system 102 aboard aircraft 101. The spoofing scenario further includes a vehicle tracker 140 for tracking the range between tracker 140 and aircraft 101, and a simulator 150 coupled to a spoofing signal transmitter 160 coupled to transmitting antenna 165 for creating a spoofing-satellite information signal environment consistent with that as received by GPS signal receiver system 130 and GPS signal receiver system 102 for ultimately driving the position output information from GPS signal receiver system 102 to a desired state.

Spoofing signal transmitter 160 is generally capable of providing signals of signal strength greater than the satellite information signals 11, 12, 13 and 14 tracked by GPS signal receiver system 102 so that GPS signal receiver system 102 tracks only those signals generated by spoofing signal transmitter 160.

It is the intended function of the combination of simulator 150 and transmitter 160 to initially provide signals substantially coherent with satellite information signals 11, 12, 13 and 14 such that aircraft GPS signal receiver system 102 begins tracking those spoofing-satellite information signals transmitted through antenna 165, indicated by numeral 167, and which resemble satellite information signals 11, 12, 13 and 14. Once the spoofing-satellites signals are tracked by GPS signal receiver system 102 as "legitimate" GPS information signals because of their greater signal strength, simulator 150 may purposefully provide erroneous information for subsequent signal transmission by spoofing signal transmitter 160. The spoofing signals transmitted will have signal characteristics, and coded information therewith, such that aircraft GPS signal receiver system 102 will output erroneous estimated satellite position data unbeknown to aircraft 101.

Before proceeding, it should be noted the spoofing signal 167 transmitted by spoofing signal transmitter 160 and corresponding antenna 165 is identical in form to those satellite information signals transmitted from the transmitters aboard the individual legitimate satellite vehicles which form, in part, the satellite positioning system. Accordingly, it should be recognized that GPS signal receiver system 102 and associated antenna 104 simply responds to "satellite information signals" regardless from which transmitter they originated. Therefore, it is helpful in understanding the present invention to distinguish "transmitter" specific characteristic information derived from those satellite information signals as received by the antenna. (Herein, transmitter location is synonymous with antenna location, although they may be physically separated.)

Figure 2:
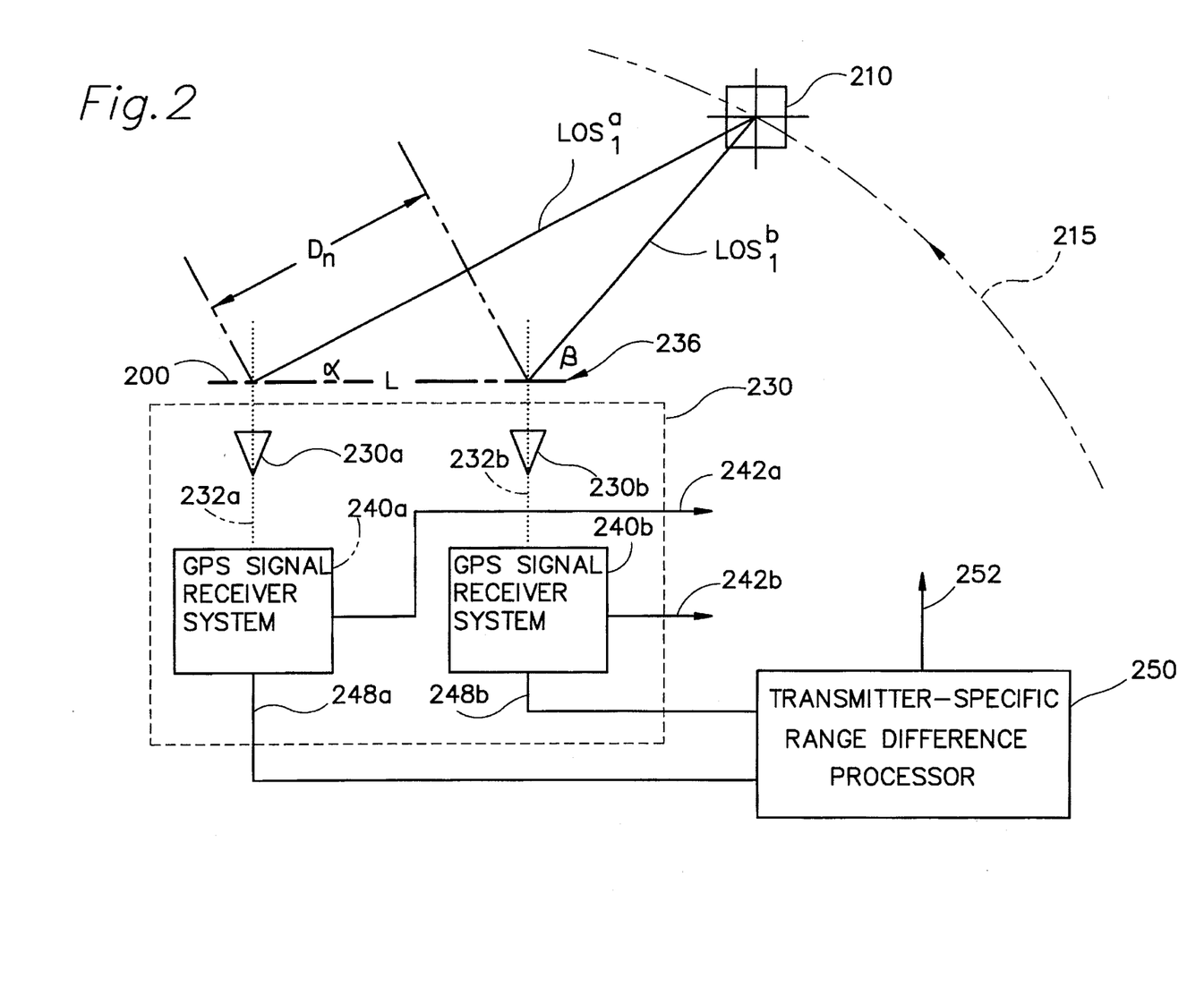
FIG. 2 is a block diagram illustrating the principles of a spoofing detection system in accordance with the present invention.

FIG. 2 is an illustration depicting the mechanics of a GPS spoofing detection system in accordance with the present invention. In this illustration, only one satellite is shown in order to simplify understanding of the spoofing detection system, whereas a minimum of four satellites are necessary for a GPS determined estimated position, and at least five are generally required for application of a GPS signal receiver system autonomous integrity monitoring system.

As illustrated in FIG. 2, thereshown is a first satellite vehicle 210 having a geocentric position $R_1$ at measurement time $t_{m1}$ having geocentric coordinates "X, Y, Z". It should be noted that satellite 210 is shown following orbit 215 moving from lower right to upper left. Two physically separated antennae, antenna 230a and antenna 230b, are rigidly fixed to a platform 200, representing an aircraft body. The pair of antennas 230a and 230b are separated by a known separation distance "L". The coordinate positions of antennae 230a and 230b may also be known relative to a known platform coordinate reference frame.

Identical GPS receiver systems 240a and 240b separately receive an electrical signal from antennae 230a and antenna 230b, respectively. Accordingly, only receiver system 240a and antenna 230a will be described. The subsequent designations "a" and "b" refers to those signals separately received by either antenna 230a or antenna 330b, and separately processed by either GPS signal receiver system 240a or 240b.

Again referring to the embodiment of the invention depicted by the block diagram of FIG. 2, antenna 230a is configured to receive satellite information signals from those satellites which form the GPS satellite positioning system and provide an electrical signal 232a indicative of the received signals. Electrical signal 232a is provided as an input to GPS signal receiver system 240a. GPS signal receiver system 240a processes electrical signal 232a and provides GPS position information on signal line 242a. Second antenna 230b provides an electrical signal 232b, similar to that provided by antenna 230a, and is presented to GPS signal receiver system 240b. GPS signal receiver system 240b processes electrical signal 232b and provides GPS position information on signal line 242b.

Before proceeding, it is well understood that the GPS satellite information signal from each of the satellites contains coded information which includes, among other information, the satellite vehicle or transmitter identification number, satellite trajectory information, both ephemeris data and almanac data, from which the geocentric position of the satellites may be determined, as well as other such information. Further, as is common in the NAVSTAR global positioning system, each of the satellites transmits a satellite information signal of the same frequency, but varying pseudo random code. From the pseudo random code, the GPS signal receiver system 240 identifies the satellite vehicles, tracks the transmitter-specific satellite information signals, and determines the transmitter-specific pseudo ranges. Transmitter-specific pseudo ranges, herein, generally refers to the estimated range between the position of the receiving antenna and a particular satellite which is related to delay time from the time of transmission of the transmitter-specific information signal to the time as received by the GPS signal receiver system.

GPS signal receiver system 240a, like those commonly known in the art, serve to process the coded information on the satellite information signal from a plurality of satellites for a determination of the estimated position of the antenna. This may be accomplished by a variety of techniques including aforesaid pseudo range measurements or, alternatively, carrier phase measurements. The latter is commonly embedded in GPS signal receiver systems known in the art where the satellite information signal characteristics are preserved and processed for the aforesaid carrier phase measurements.

As further understood in the art, GPS signal receiver system 240a, like those commonly employed in the art, includes processing components capable of providing the transmitter-antenna-specific GPS position information on signal line 242a. GPS position information may include, but not limited to, estimated position of the associated antenna, satellite trajectory information or satellite position at specific measurement times, signal measurement times, satellite identification information, pseudo range, pseudo range rate, lineof-sight vector matrix $H(t_m)$ between antenna and satellite, and other such information.

The transmitter-antenna-specific pseudo range information, designated $P_n^a$ and $P_n^b$ corresponding the nth satellite and either antenna "a" or "b"—antenna 230a and 230b, respectively, may be filtered pseudo ranges referred to in the art as "smoothed" pseudo ranges. It should be noted that the lineof-sight vector matrix $H(t_m)$ is substantially the same for either antennae 230a or 230b because of the much larger range distance to the satellite as compared to the closeness of the antennae. With regard to FIG. 2, signal line 242a and 242b represents one or more signal lines for transmitting the intended information, preferably in digital form for processing by subsequent signal or data processors.

Further, as illustrated in FIG. 2, GPS signal receiver system 240a provides selected output information on signal line 248a, and GPS signal receiver system 240b provides selected output information on signal line 248b. Like signal line 242a, signal line 248a and 248b represents one or more signal lines for transmitting the intended information, preferably in digital form for subsequent signal processing. Signal lines 248a and 248b are presented as inputs to transmitter-specific range difference processor 250. As will be more fully understood by way of the description which follows, GPS signal receiver systems 240a and 240b each provide satellite specific range information on signal lines 248a and 248b, respectively, in a selected form and at a common measurement time. For example, the information may in the form of transmitter-antenna-specific pseudo range values, transmitter-antenna-specific pseudo range rate values, carrier phase values, Doppler counts, or the like, indicative of the relative range difference between one antenna and one specific satellite.

Figure 3:
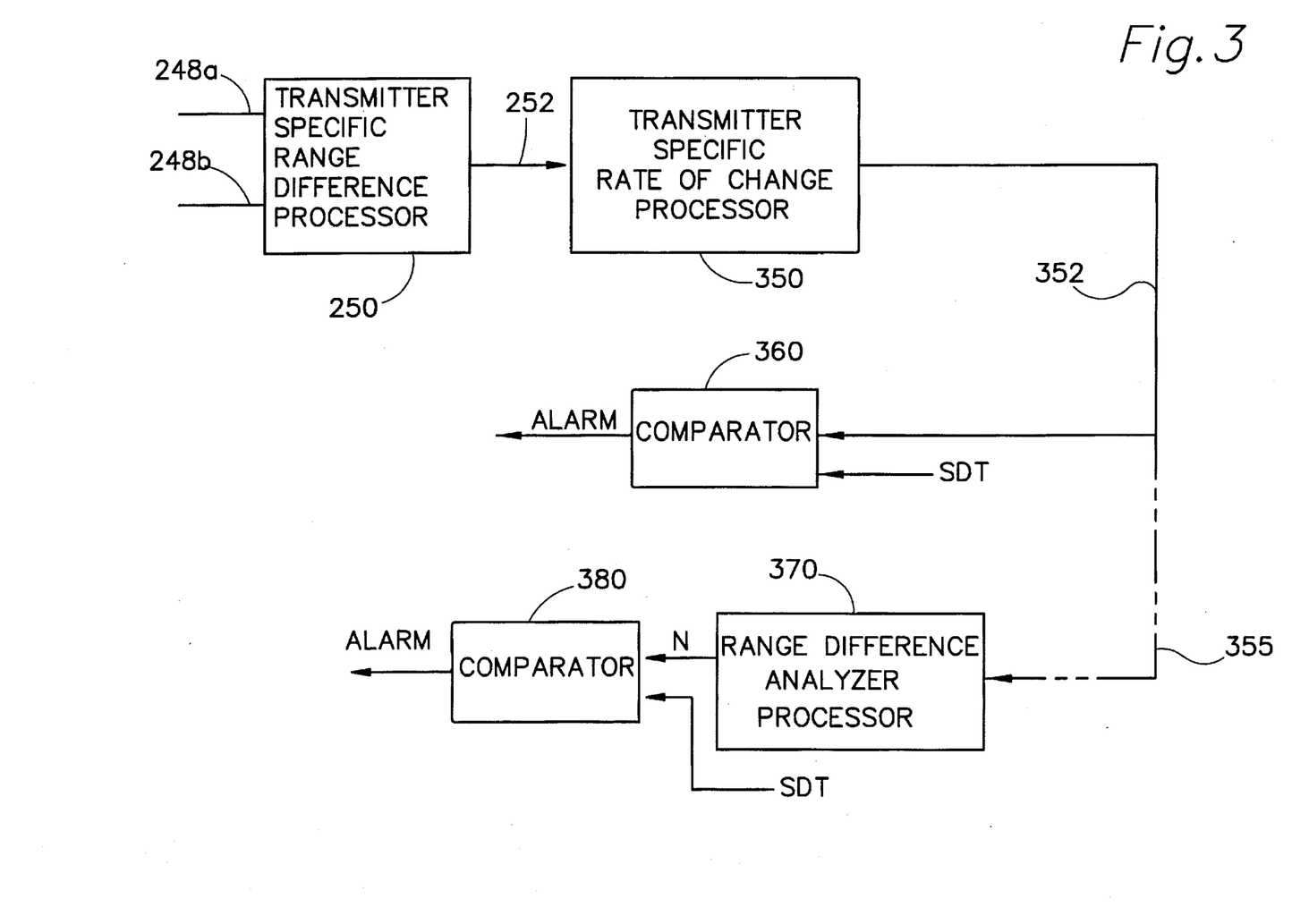
FIG. 3 is a block diagram of another embodiment of the a spoofing detection system in accordance with the present invention.

As illustrated in FIG. 2, output signal lines 248a and 248b are presented as inputs to transmitter-specific range difference processor 250 for operating on the transmitter-specific range information provided by each of the GPS signal receiver systems 240a and 240b for providing transmitter-specific range difference information on output signal line 252. Output signal line 252 is presented for subsequent processing as illustrated in FIG. 3.

The transmitter-specific range difference information represents the relative range difference between a specific transmitter transmitting a satellite information signal and each antennae, 230a and 230b, derived from satellite information signals from the same transmitter as received by antenna 230a and 230b, at substantially a common measurement time. (Noting, again, that the satellite information signal may be transmitted from a legitimate transmitter aboard a satellite vehicle or from the spoofing signal transmitter.)

As will be more fully appreciated, in practice of the present invention, GPS signal receiver systems 240a and 240b are configured to track the intended satellite-like information signals, and provide their GPS position information synchronized to a common measurement time. Alternatively, GPS signal receiver systems 240a and 240b may be a multiplexed single receiver system, also providing output information synchronized to a common measurement time. GPS signal receiver systems 240a and 240b, and antennae 230a and 230b may be similar to those described in U.S. Pat. No. 5,177,489, entitled "Pseudolite-Aided Method for Precision Kinematic Positioning", issues to Ronald R. Hatch.

In one embodiment of the invention, GPS signal receiver systems 240a and 240b, in combination with antennas 230a and 230b serves to obtain pseudo range values $P_n^a$ and $P_n^b$ derived from the transmitted satellite information signals from satellite vehicle 210, where the subscript "n" refers to the specific satellite vehicle, e.g., "1", corresponding to satellite vehicle $SV_1$, and the superscript refers to the specific signal receiver system antenna, namely "a" or "b", corresponding to antennae 230a and 230b, respectively.

It should be noted here that satellite vehicle 210 may also represent the spoofing signal transmitter, the only difference being the spatial proximity to antenna 104 aboard the mobile unit, namely aircraft 101. The nomenclature remains the same since the spoofing signal also include the satellite vehicle identification number, i.e. a specific transmitter aboard the satellite vehicle, and herein represented by the subscript "n".

GPS signal receiver system 240 represents the customary satellite information signal receiving and processing circuitry and performs the necessary functions for deriving the pseudo range values $P_n^a$ and $P_n^b$ as is well known, the details which are not described herein. However, it should be suffice to say that pseudo range values $P_n^a$ and $P_n^b$ have been interpolated or extrapolated to a common measurement time. That is, the pseudo range values $P_n^a$ and $P_n^b$ are those range values between the geocentric position of a specific satellite, e.g., vehicle 210, and each antenna 230a and 230b at specific measurement times.

The geometric relationship between is further illustrated in FIG. 2. More specifically, the line of sight vectors $LOS_n^a$ and $LOS_n^b$ between satellite vehicle 210 and each antenna 230a and 230b, respectively, establishes a transmitter-antenna-specific pointing angles α and β, respectively, relative to reference line 236 passing through GPS antennae 230a and 230b. Reference line 236 may be described by a unit vector from one antenna to the other, namely 230a and 230b respectively, as defined by $V_n^{a,b}(t_m)$. In accordance with the present invention, antennae 230a and 230b are separated by the known distance "L" collinear with reference line 236. As before, the subscript "n" refers to the specific satellite vehicle, e.g., "1", corresponding to satellite vehicle $SV_1$, and the superscript refers to the specific signal receiver system antenna, namely "a" and/or "b" corresponding to antennae 230a and 230b, respectively As further illustrated, a line projected from the intersection of reference line 236 and vector $LOS_n^b$ perpendicular to vector $LOS_n^a$ defines the mathematical relationship for the difference between the magnitude of the line-of-sight vectors $LOS_n^a$ and $LOS_n^b$ herein referred to as the range difference "D" defined as:

$$D_n(t_m) < |LOS_n^a(t_m)| - |LOS_n^b(t_m)| \cong P_n^a(t_m) - P_n^b(t_m)$$

where superscripts "a" and "b" refer to the antennae 230a and 230b respectively, and "n" refers to the specific satellite vehicle as before.

The above equation indicates that the transmitter-specific range difference is related to the pseudo range difference as measured from the specific transmitter to each antenna. It should be noted that other GPS signal receiver system measurements may be utilized for transmitter-specific range difference values related to the pointing angles as described above. More specifically, the transmitter-specific range difference values $D(t_m)$ described above may be derived, for example, from (i)the phase difference $\Delta\phi_n^{a,b}$ between the received transmitter-specific carrier signals as observed by the two antennae 230a and 230b, (ii) the difference in transmitter-specific Doppler shift of the satellite information signal as observed by the two antennae, and (iii) the difference in transmitter-antenna-specific pseudo range rate measurements, the latter three techniques deriving the appropriate information from the carrier signal associated with each satellite information signal.

In the following discussion, it will be assumed that each of the measurements is associated with a specific satellite information signal from a specific transmitter, and therefore the "transmitter" designation will be implied.

With regard to carrier phase measurements, the carrier phase difference between those satellite information signals as observed between the two antennae is mathematically related to the pseudo range difference by:

$$\Delta\rho = \frac{\Delta\phi}{2\pi} w$$

where $\Delta\phi$=phase difference between the two carrier signals w=wavelength of carrier signal (0.18 meters)

It should be noted that GPS signal receiver system 240, like those known in the art, is further capable of determining the carrier phase of the satellite information signal as observed by the two antennae 230a and 230b, as is also well known in the art. Accordingly, the range difference $D(t_m)$ may be mathematically described as:

$$D_n(t_m) \cong |LOS_n^a(t_m)| - |LOS_n^b(t_m)| \cong \Delta\phi_n^{a,b} = \phi_n^a - \phi_n^b$$

Regarding the Doppler shift measurements, the carrier signals received at the two separated antennae 230a and 230b will differ in frequency due to the difference in the observed Doppler frequency shifts due to the relative speed of the moving antennae and satellite. The Doppler shifts differ between the two antennae locations due mainly to the angular rates being experienced by the aircraft. Therefore, since there is almost always some sustained low-level aircraft angular motion activity, and since the Doppler shifts in the two carrier signals can be determined very accurately (via the integrated Doppler counts), a means exists for determining satellite pointing angles by a technique similar to that discussed above which used pseudo range difference measurements directly or by the carrier phase difference measurement.

The relative pseudo range difference values $\Delta\rho_n$ may be determined using the integrated Doppler counts, carrier phase measurements, or pseudo range rate measurements independently derived from the carrier signals observed by the two antennae locations and processed by the independent GPS signal receiver systems 240a and 240b. As illustrated in FIG. 2, these different transmitter-antenna-specific measurement values, including transmitter-antenna-specific pseudo range values, are represented by output signal lines 244a and 244b having such measurement information. As indicated earlier, these kinds of measurements, i.e., pseudo range, pseudo range rate, carrier phase, and integrated Doppler counts are commonly performed in commercially available GPS system receivers in a manner well known to those skilled in the art of GPS system receiver design, and selectively derive such measurements from either the coded information associated with the satellite information signal, and/or the carrier signal associated with the transmitted satellite information signal.

With regard to the pseudo range rate measurement technique, the difference in the transmitter-antenna-specific values of ρ at the two antenna locations may be determined by observing that the satellite velocity vector is the same for both antennae, and that the aircraft velocity for the two differ only as a result of the angular velocity of the aircraft, which leads to the difference in the two values of ρ as $$\Delta\rho = L(\underline{w} x \, \underline{U}_a) \cdot \underline{U}_p \quad (22)$$

where w=angular velocity vector of the aircraft $U_a$=unit vector along the line connecting the two antennae $U_p$=unit vector of $LOS_n^a$ or $LOS_n^b$ L=distance between the two antennae It is of paramount importance in understanding the present invention that the pointing angles α and β of the line of sight vectors, illustrated in FIG. 2, pointing at a specific satellite are approximately equal and slowly varying in response to changes in the position of satellite vehicle 210. This is so since the rate of change in position of the aircraft 101, and more importantly the antennae 230a and 230b, is much slower relative to the rate of change in position of the satellite vehicle 210, and also the great distance between the antennae and the satellite vehicle relative to the relatively very small separation distance L, in the order of several carrier signal wavelengths, for example one meter. Accordingly, the rate of change in the transmitter-specific range difference $\dot{D}(t_m)$ is also slowly varying for a fixed sample rate with small time intervals (approximately 1 second), having magnitude and sign related to the derived antenna pointing angle for each satellite defined earlier.

In contrast, the spoofing scenario is generally one in which the spoofing signal transmitter 160 and antenna 165 is in a fixed location and in relatively close proximity (less than 50 miles) to aircraft 101 or other mobile unit. In this situation, the rate of change in the difference between the transmitter-antenna-specific pseudo range values $P_n^a$ and $P_n^b$ derived from those satellite information signals generated by spoofing signal transmitter 160 and antenna 167 are greater than those values associated with the legitimate satellite-aircraft scenario.

It should be noted that although the aforesaid spoofing scenario may alter the data on the erroneous satellite-like information signals and thereby alter the derived pseudo range values, the transmitter-antenna-specific pointing angle will be sufficiently different than the expected legitimate GPS satellite information signal characteristics and discernible so as to be used as a discriminant for a detector for the presence of a satellite information signal transmitted from a spoofing signal transmitter.

Shown in FIG. 3 is signal processing scheme in accordance with the present invention for detecting the presence of satellite information signals transmitted from a spoofing signal transmitter. Transmitter-specific range difference processor 250 from FIG. 2 is again shown having its output 252 presented as an input to rate of change processor 350. The information on signal line 252 represents the transmitter-specific range difference $D_n(t_m)$ as a function of either the pseudo range values as expressed above, or other values as described earlier.

Rate of change processor 350 serves the function of determining the transmitter-specific rate of change of the transmitter-specific range difference expressed as $\dot{D}_n(t_m)$. In turn, processor 350 provides the value of $\dot{D}_n(t_m)$ as information on signal line 352 which is presented as an input to comparator 360. Comparator 360 compares each value of the set of rate of change difference values $\dot{D}_n(t_m)$ with a spoof detection threshold value "SDT" for generating an alarm based on a single transmitter-specific range difference $\dot{D}_n(t_m)$ exceeding a specified spoofing detection threshold designated SDT.

Alternatively, as shown by dotted line 355, all of the transmitter-specific rate of change values of the transmitter-specific range difference values $\dot{D}_n(t_m)$ may be subsequently analyzed by analyzer processor 370 for providing a numerical value "N" which may be subsequently compared by comparator 380 with a selected detection threshold SDT'. Analyzer processor 370 may be implemented by a wide array of techniques including, but not limited to a least squares data analysis, or the like, to detect a sudden change in the transmitter-antenna-specific pointing angle relative to the array of transmitters associated with the satellite information signals from as opposed to a satellite information signal from an erroneous spoofer generated satellite information signal transmitted from a spoofing signal transmitter.

In other words, analyzer processor 370 characterizes the behavior of the rate of change of the transmitter-specific range difference values for the tracked satellites and subsequently compares a statistical value N to some norm value. Analyzer processor 370 may continuously monitor distinct values, averages, or other statistical value to obtain the desired indication of the presence of a satellite information signal originating from the spoofing signal transmitter 160.

Figure 4:
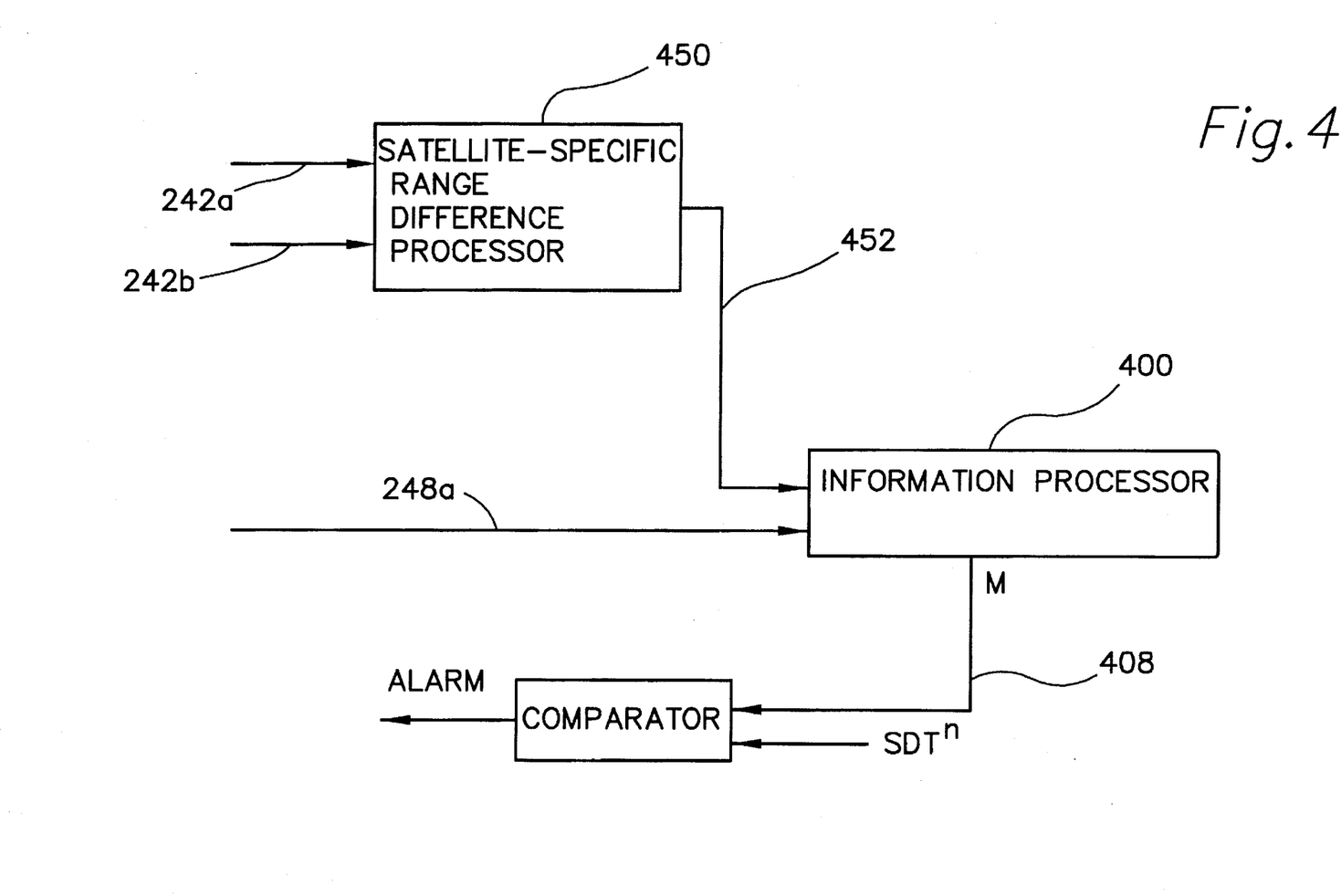
FIG. 4 is block diagram of another arrangement of the spoofing detection system in accordance with the present invention.

Illustrated in FIG. 4 is another implementation of a spoofing detection system in accordance with the principles of the present invention and including carrier phase signal processing. More specifically, GPS signal receiver systems 240a and 240b provide carrier phase measurements on signal lines 248a and 248b to transmitter-specific range difference processor 450. Transmitter-specific range difference processor 450 provides an output on signal line 452 presented as an input to information processor 400.

Transmitter-specific phase difference processor 450 is configured for the specialized case for transmitter-specific range difference measurements derived from carrier phase measurements. Transmitter-specific phase difference processor 450 serves to determine the phase difference between the signals received by the pair of antennae, namely antennae 230a 230b. Transmitter-specific phase difference processor 450 is operative for monitoring the phase of the received carrier signals for each of the tracked satellite information signals, and determining the phase change between two successive sample times and producing an output signal indicative thereof, and identified as $\Delta\psi_n(t_{m1,m2})$, where "m1", and "m2" represent the two successive measurement times. As before, the aforesaid phase change information on signal line 452 is also representative the transmitter-specific range difference $D_n(t_m)$, but which is a function of the carrier phase measurements associated with each tracked satellite information signal.

As further illustrated in FIG. 4, the GPS signal receiver system 240a specifically provides the line-of-sight matrix $H(t_m)_m)$ on signal line 242a. Line-of-sight matrix $H(t_m)$ describes the vectors between one of the antennae, for example 230a, and each of the tracked satellites.

Data processor 400 receives the line-of-sight matrix information $H(t_m)$ on signal line 242a and the carrier phase change information $\Delta\psi(t_{m1,m2})$ on signal line 452 for determining a discriminant "M" which may be compare with a spoofing detection threshold value $SDT'''$ alerting the user of the a presence of a satellite information signal generated by a spoofing signal transmitter.

In this regard, consider the situation where the vector "$V(t_m)$" represents the vector between the geocentric positions of antennae 230a and 230b in geocentric space, and let $\Delta V$ represent the change in vector $V(t_m)$ between two measurement times, namely:

$$\Delta V = V(t_{m2}) - V(t_{m1})$$

The range difference measurement $D(t_m)$., may described by:

$$D_n(t_m) = LOS_n \cdot V(t_m)$$

where the subscript "n" represents a specific tracked satellite vehicle, and $LOS_n$ represents the line-of-sight vector, as before, from either antenna 230a or 230b, since they are approximately equal for a satellite far away.

For close measurement times, then the change in $D(t_m)$ between measurement times m1 and m2 may be described by the integrated carrier phase measurement $\Delta\phi_n(t_{m1,m2})/2\pi$ multiplied by the carrier wavelength $\lambda$, namely:

$$\Delta D_n = LOS_n \cdot \Delta V = \frac{\Delta\Psi_n(t_{m1,m2}) * \lambda}{2\pi}$$

In the above equation, $\Delta V$ may be determined by a least square estimation process which may be described in vector matrix notation as follows:

$$[\Delta V] = \frac{[LOS]^T}{[[LOS]^T \cdot [LOS]]} \cdot [\Delta D]$$

In turn, the value of $\Delta D$ may be determined as a function of the least squares estimate of $\Delta V$, namely:

$$[\Delta \hat{D}] = [LOS] \cdot [\Delta V]$$

In turn the normal of the difference vector may be determined as follows:

$$M = |[\Delta D] - [\Delta \hat{D}]|$$

Here M is a scalar which may be used as the discriminant compared with spoofing detection threshold value $SDT'''$. If M is greater than $SDT'''$, then a spoofing satellite information signal has been detected.

It should be noted that in the above mathematical description, the vector matrix $[\Delta V]$ represents a matrix of the angle between the vector $V(t_m)$ and the line-of-sight vector $LOS_n$, i.e. the antenna pointing angle. If the antenna pointing angle varies grossly from legitimate GPS satellite information signals, then the discriminant M will exceed the threshold, and the direction of the spoofing signal generator may be determined for subsequent elimination or jamming.

Again referring to FIG. 4, like FIG. 3, the output value "M" from information processor 450 is presented as an input to comparator 480 for comparison with an input representative the value $SDT'''$, thereby providing an indication of a tracked satellite information signal transmitted from a spoofing signal transmitter.

In the method of the present invention, transmitter-specific range difference values are determined to provide an indication of the pointing angle from a GPS signal receiver system antenna toward the position of a transmitter which transmits a GPS-like satellite information signal. In the legitimate GPS scenario, each transmitter-specific range difference value is related to the difference between (I) the transmitter-antenna-specific range from one transmitter to one of a closely space pair of antennae, and (ii) the transmitter-antenna-specific range between the same transmitter and the other of the pair of antennae, at substantially the same measurement times. In turn, the rate of change of the pointing angle or information characteristic thereof, is used as a discriminant for determining the change from a legitimate GPS scenario as compared with satellite information signals transmitted by a spoofing signal transmitter at substantially closer range. Employment of the pair of antennae permits the calculation of the pointing angle from which that angle and/or the rate of change thereof may be monitored and/or analyzed to provide an indication of erroneous spoofing satellite-like information signals. This is so since the rate of change of the pointing angle, or other information indicative thereof, should be consistent with expected behavior of legitimate satellite information signals being transmitted from the far away satellite information signal transmitter aboard each of the satellite vehicles, as compared to the behavior of satellite-like information signals being transmitted from a spoofing signal transmitter.

As described herein. an indication of the pointing angle is directly related to the transmitter-specific range difference between the origin of the carrier signal, namely the transmitter, and the two antennae. The transmitter-specific range difference may be observed by either monitoring the behavior of the pseudo random code associated with the carrier of the satellite information signal, or the carrier itself. In turn, pseudo range measurements, pseudo range rate measurements, carrier phase measurements, and or Doppler count measurement associated with the two antennae may be use to obtain the desired discriminant.

It should be recognized that the schematic block diagrams particularly illustrated in FIGS. 2, 3, and 4 may be configured by employment of many electronic subsystems, computers, and software/firmware implementations, all of which are intended to be within the true spirit and scope of the present invention. As is well understood in the art, a single electronic/software subsystem may be employed for performing the appropriate calculations and generation of the spoofing discriminant and alarms as well known to those skilled in the art.

It should be noted that any such satellite positioning system by which an aircraft may obtain geocentric position information from satellite information signals is intended to be within the true spirit and scope of the present invention.

The embodiments of an invention in which an exclusive property or right is claimed are defined as follows:

1. A satellite positioning system receiver system capable of detecting a change from receiving (i) satellite information signals transmitted from a transmitter aboard satellite vehicles which form, in part, a satellite based global positioning system, where each of said satellite information signals consists of a carrier signal having coded satellite-specific information, therewith, from which (a) the estimated position of said satellite vehicles may be determined at selected moments in time, (b) the range between a satellite information signal receiver system antenna and selected ones of said satellite vehicles may be estimated, and (c) the position of the satellite information signal receiver system antenna may be estimated, and (ii) reception of one or more satellite information signals transmitted from a spoofing signal transmitter and which contain erroneous satellite-specific information therewith, said satellite positioning system receiver system comprising:

signal receiver system means for tracking said satellite information signals, said signal receiver system means including, first and second antennae, separated by a known separation distance, for separately receiving said satellite information signals and producing first and second electrical signals, respectively, in response to said received signals;

means for deriving first satellite-specific information from said first electrical signal for each received satellite information signal, and for deriving second satellite-specific information from said second electrical for each received satellite information signal;

means for deriving transmitter-specific range difference values, where each of said transmitter-specific range difference values is derived from said first and second satellite-specific information associated with a single satellite information signal transmitted from a single transmitter, and where each of said transmitter-specific range difference values is related to the difference between a first range measurement derived from said first satellite-specific information and a second range measurement derived from said second satellite-specific information associated with said single transmitter, where said first and second range measurements are related to the apparent range between said single transmitter and said first and second antennae, respectively;

means for determining transmitter-specific rate of change values associated with one or more of said transmitters, where each of said transmitter-specific rate of change values corresponds to a rate of change of a transmitter-specific relative range difference value; and analyzing processor means responsive to one or more of said transmitter-specific rate of change values for providing an indication of receiving satellite information signals from a spoofing signal transmitter.

2. A satellite positioning system receiver system capable of detecting a change from receiving (i) satellite information signals transmitted from a transmitter aboard satellite vehicles which form, in part, a satellite based global positioning system, where each of said satellite information signals consists of a carrier signal having coded satellite-specific information, therewith, from which (a) the estimated position of said satellite vehicles may be determined at selected moments in time, (b) the range between a satellite information signal receiver system antenna and selected ones of said satellite vehicles may be estimated, and (c) the position of the satellite information signal receiver system antenna may be estimated, and (ii) reception of one or more satellite information signals transmitted from a spoofing signal transmitter and which contain erroneous satellite-specific information therewith, said satellite positioning system receiver system comprising:

signal receiver system means for tracking said satellite information signals, said signal receiver system means including, first and second antennae, separated by a known separation distance, for separately receiving said satellite information signals and producing first and second electrical signals, respectively, in response to said received signals;

means for deriving first satellite-specific information from said first electrical signal for each received satellite information signal, and for deriving second satellite-specific information from said second electrical for each received satellite information signal;

means for deriving transmitter-specific discriminant values, where each of said transmitter-specific discriminant values is derived from said first and second satellite-specific information associated with a single satellite information signal transmitted from a single transmitter, and where each of said transmitter-specific discriminant values is related to a transmitter-specific pointing angle, where said pointing angle is the angle between (i) a vector from said first to said second antenna, and (ii) a vector from said first antenna to one of said transmitters analyzing processor means for analyzing said transmitter-specific discriminant values and determining a statistical value of said transmitter-specific discriminant values; and means for comparing said statistical value with a selected detection threshold value where said comparison is indicative of said statistical value deviating from a selected norm of operation consistent with the behavior of satellite information signals transmitted from satellite vehicle transmitters, thereby providing an indication of receiving satellite information signals from a spoofing signal transmitter.

3. A method for detecting a satellite positioning system signal receiver system receiving satellite information signals transmitted from a spoofing signal transmitter and which contain erroneous satellite-specific information therewith, as compared to those satellite information signals transmitted from a transmitter aboard satellite vehicles which form, in part, a satellite based global positioning system, where each of said satellite information signals consists of a carrier signal having coded satellite-specific information, therewith, from which (a) the estimated position of said satellite vehicles may be determined at selected moments in time, (b) the range between a satellite information signal receiver system antenna and selected ones of said satellite vehicles may be estimated, and (c) the position of the satellite information signal receiver system antenna may be estimated, said method comprising the steps of:

separately receiving said satellite information signals through first and second antennae, separated by a known separation distance, and producing first and second electrical signals, respectively, in response to said received satellite information signals;

deriving first transmitter-specific information from said first electrical signal for each received satellite information signal;

deriving second transmitter-specific information from said second electrical for each received satellite information signal;

deriving transmitter-specific discriminant values, where each of said transmitter-specific discriminant values is derived from said first and second transmitter-specific information associated with a single satellite information signal transmitted from a single transmitter, and where each of said transmitter-specific discriminant values is related to a transmitter-specific pointing angle, where said pointing angle is the angle between (i) a vector from said first to said second antenna, and (ii) a vector from said first antenna to one of said transmitters; and selectively comparing said transmitter-specific discriminant values with a selected norm of operation consistent with satellite information signals transmitted from said satellite vehicles which form, in-part, said satellite positioning system.

4. The method of claim 3 further including the steps of:

deriving first transmitter-antenna-specific pseudo range values from said coded information associated with those satellite information signals received by said first antenna;

deriving second transmitter-antenna-specific pseudo range values from said coded information associated with those satellite information signals received by said second antenna; and determining each of said transmitter-specific discriminant values as a function of the difference between said first and second transmitter-antenna-specific pseudo range values corresponding to same satellite information signal transmitted from the same transmitter.

5. The method of claim 3 further including the steps of:

deriving, from said first electrical signal, first transmitter-antenna-specific carrier signal information related to said carrier signal associated with each of said satellite information signals received by said first antenna;

deriving, from said second electrical signal, second transmitter-antenna-specific carrier signal information associated with each of said satellite information signals received by said second antenna; and deriving said first and second transmitter-specific discriminant values as a function of said first and second transmitter-antenna-specific carrier signal information.

6. The method of claim 3 further including the steps of:

deriving first transmitter-antenna-specific relative range values from said first transmitter-antenna-specific carrier signal information, where each of said first transmitter-antenna-specific relative range values is related to the range between said first antenna and one transmitter associated with a specific satellite information signal received by said first antenna;

deriving second transmitter-antenna-specific relative range values from said second transmitter-antenna-specific carrier signal information, where each of said second transmitter-antenna-specific relative range values is related to the range between said second antenna and said one transmitter associated with said specific satellite information signal received by said first antenna; and deriving said first and second transmitter-specific discriminant values as a function of said first and second transmitter-antenna-specific relative range values.

7. The method of claim 6 wherein each of said first and second transmitter-antenna-specific relative range values is a function of the carrier phase of said carrier of each of said satellite information signals as observed by said first and second antennae, respectively.

8. The method of claim 6 wherein each of said first and second transmitter-antenna-specific relative range values is a function of the pseudo range rate derived from said carrier of each of said satellite information signals as observed by said first and second antennae, respectively.

9. The method of claim 5 wherein said each of said first and second transmitter-antenna-specific relative range values is a function of the Doppler shift of said carrier of each of said satellite information signals as observed by said first and second antennae, respectively.

10. A method for detecting a satellite positioning system signal receiver system receiving satellite information signals transmitted from a spoofing signal transmitter and which contain erroneous satellite-specific information therewith, as compared to those satellite information signals transmitted from a transmitter aboard satellite vehicles which form, in part, a satellite based global positioning system, where each of said satellite information signals consists of a carrier signal having coded satellite-specific information, therewith, from which (a) the estimated position of said satellite vehicles may be determined at selected moments in time, (b) the range between a satellite information signal receiver system antenna and selected ones of said satellite vehicles may be estimated, and (c) the position of the satellite information signal receiver system antenna may be estimated, said method comprising the steps of:

separately receiving said satellite information signals through first and second antennae, separated by a known separation distance, and producing first and second electrical signals, respectively, in response to said received satellite information signals;

deriving first transmitter-specific information from said first electrical signal for each received satellite information signal;

deriving second transmitter-specific information from said second electrical for each received satellite information signal;

deriving, from said first and second transmitter-specific information, the estimated geocentric position of said first and second antennae and a line-of-sight vector matrix representative of the vectors between said first antenna and each of said satellite vehicles associated with said received satellite information signals by said first antenna;

determining the carrier phase difference between each satellite information signal received by both said first and second antennae;

determining the time rate of change of a first vector, where said first vector is representative of a vector between said first and second antennae;

calculating the rate of change of said first vector; and selectively comparing said rate of change of said first vector to a selected detection threshold value where said comparison is indicative of said statistical value deviating from a selected norm of operation consistent with the behavior of satellite information signals transmitted from satellite vehicle transmitters, thereby providing an indication of receiving satellite information signals from a spoofing signal transmitter.

* * * * *